No. 833,322. PATENTED OCT. 16, 1906.
J. W. GROOMES.
BALING PRESS.
APPLICATION FILED JAN. 25, 1906.

Witnesses.
Herbert D. Lawson.

Inventor.
J. W. Groomes.
By W. T. Fitzgerald & Co.,
Attys.

UNITED STATES PATENT OFFICE.

JOHN W. GROOMES, OF TYLER, INDIAN TERRITORY.

BALING-PRESS.

No. 833,322.

Specification of Letters Patent.

Patented Oct. 16, 1906.

Application filed January 25, 1906. Serial No. 297,902.

*To all whom it may concern:*

Be it known that I, JOHN W. GROOMES, a citizen of the United States, residing at Tyler, Chickasaw Nation, Indian Territory, have invented certain new and useful Improvements in Baling-Presses; and I do hereby declare the following to be a full, clear, and exact description of the invention, such as will enable others skilled in the art to which it appertains to make and use the same.

My invention relates to baling-presses; and its object is to provide a manually-operated device of this character which has great power and which has mechanism for mechanically assisting the operator in compressing the material fed to the press.

The invention consists of a baling-compartment which may be of any preferred construction and in which is slidably mounted a plunger, which is connected by means of a link to an operating-lever or frame which is normally spring-supported. Said spring is so disposed in relation to the fulcrum of the lever or frame as to materially assist the operator in compressing the bale.

The invention also consists in further novel construction and combination of parts hereinafter more fully described and claimed.

In the accompanying drawings I have shown the preferred form of my invention.

Figure 1:
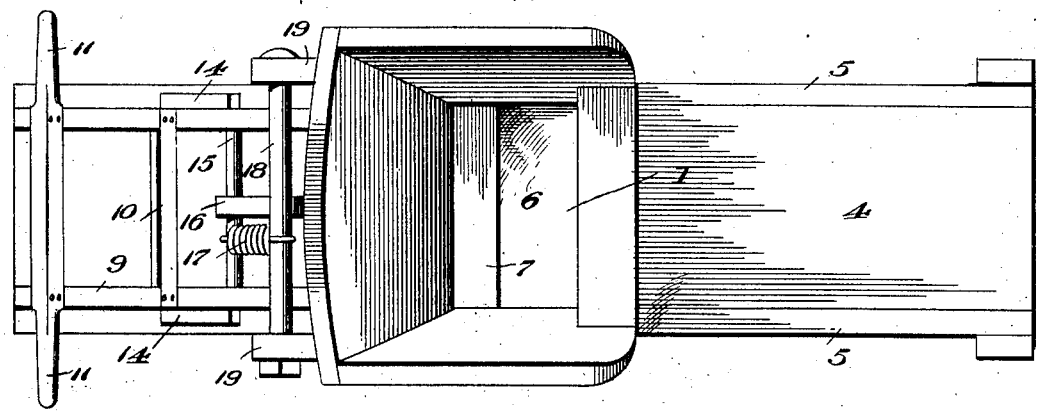
Figure 2:
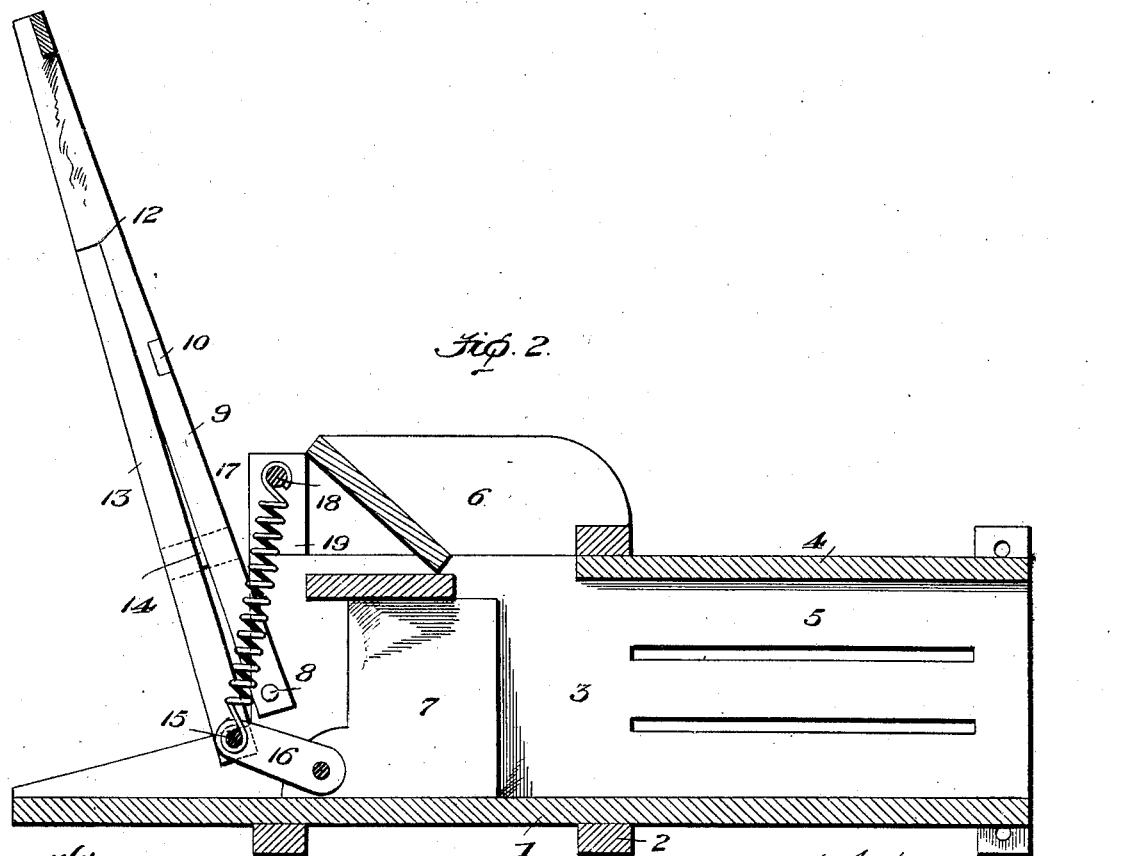

In said drawings, Figure 1 is a plan view of my improved baling-press, and Fig. 2 is a central vertical section therethrough.

Referring to the figures by numerals of reference, 1 is the bottom of the baling-press, the same being mounted on suitable cross-strips 2 and having sides 3 extending from said bottom, said sides being connected at their forward ends by the top 4, whereby a compressing-compartment 5 is produced. A hopper 6 is disposed in rear of the top 4 and serves to direct material upon the bottom 1 and in rear of the compressing-compartment 5.

Mounted between the sides 3 is a plunger 7, which is adapted to slide on the bottom 1 and when forced forward will compress material within the compartment 5. A pair of stub-shafts 8 extends through the sides 3 in rear of plunger 7, and pivotally mounted on these stub-shafts are parallel beams 9, which are connected by cross-strips 10 to produce a rectangular frame having handles 11 at its free end. Beams 9 are shouldered adjacent their free ends, as shown at 12, and abutting against these shoulders are longitudinally-extending strips 13, which are suitably connected to the beams, as by means of reinforcing devices 14, and these strips 13 project beyond the pivoted ends of beams 9 and are connected by a cross-rod 15.

A link 16 is pivotally mounted on the rod 15 and is similarly connected to the rear of plunger 7. A coiled spring 17 extends from rod 15 to a cross-rod 18, mounted on standards 19, extending upward from sides 3 in rear of hopper 6. Spring 17 is constantly under tension, and therefore exerts a continuous pull upon the rod 15. In view of this arrangement the frame formed of the beams 9 and cross-strips 10 is normally supported by said spring, as shown in Fig. 2, and when in this position the plunger 7 is disposed in rear of the hopper 6.

In using the device the material to be baled is fed between the walls 3 and in front of plunger 7 through hopper 6. The operator then pulls downward on the handles 11, and such movement will cause rod 15 to swing past the stub-shafts 8, which are the pivots of the beams 9, and as soon as rod 15 passes the stub-shafts 8 the spring 17 will draw upward thereon and will materially assist the operator in forcing the plunger 7 forward into compartment 5. Each forward stroke of the plunger will of course compress the material within the compartment, and when it is desired to return the plunger the operator pulls upward on the handles 11 until rod 15 passes stub-shafts 8, whereupon the spring 17 will continue the upward movement of the handles.

A baling-press such as herein described makes it possible to manually operate the baling-press and produce results the equal of those which are produced by the employment of mechanical or horse power. The press is very light in construction, although durable, and can therefore be readily transferred from place to place, particularly in view of the fact that no complicated mechanism is utilized.

I attach particular importance to the arrangement of the strips 13 in relation to beams 9. As these strips receive practically all of the strain incident to the actuation of the plunger 7, it is desirable to cause the line of pressure to extend longitudinally of the strips, and by reason of the peculiar construction provided by me this result is obtained.

The shoulders 12 directly receive the pressure produced by the compression of material, and there is no danger of any of the parts working loose and becoming detached as a result of the constant operation of the mechanism.

What I claim is—

1. In a baling-press the combination with a compressing-compartment and a plunger adapted to reciprocate therein; of an actuating-beam pivotally connected to the press, longitudinally-extending strips secured to said beam, resilient means for normally supporting said beam and means for transmitting motion from the beam to the plunger, said resilient means adapted to assist in the actuation of the beam and plunger.

2. In a baling-press the combination with a compressing-compartment and a plunger adapted to reciprocate therein; of an actuating-beam pivotally connected to the press, longitudinally-extending strips secured to said beam, a link connection between the strips and plunger and a resilient device adapted to normally support the beam and to assist said beam in the actuation of the plunger.

3. In a baling-press the combination with a compressing-compartment and a plunger adapted to reciprocate therein; of a beam pivotally connected to the press, strips secured thereto and extending therebeyond, a cross-rod connecting the lower ends of said strips, a link connection between the cross-rod and plunger and a spring secured at opposite ends to the cross-rod and press, respectively.

4. In a baling-press the combination with a reciprocating plunger; of a pivoted actuating-frame, strips secured to and extending beyond the pivoted end of said frame, a cross-rod connecting said strips, a spring fixedly secured at one end and fastened at its other end to the cross-rod and a link connection between said cross-rod and the plunger.

5. In a baling-press the combination with a plunger; of a pivoted frame for actuating the plunger, said frame consisting of shouldered side beams and connections therebetween, strips secured to the beams and abutting against the shoulders, said strips projecting beyond the pivots of the beams, a cross-rod at the lower end of said strips, a link connection between the cross-rod and the plunger and a spring connected at one end to the cross-rod and fixedly at its other end, said spring adapted to normally support the frame and to assist said frame in the actuation of the plunger.

In testimony whereof I have signed my name to this specification in the presence of two subscribing witnesses.

JOHN W. X GROOMES.
his  mark

Witnesses:
T. M. CARR,
L. D. COLLINS.